(12) United States Patent
White et al.

(10) Patent No.: US 6,790,904 B2
(45) Date of Patent: Sep. 14, 2004

(54) LIQUID COATING OF FILM-FORMING RESIN AND PARTICLES CHEMICALLY MODIFIED TO LOWER SURFACE TENSION

(75) Inventors: Daniela White, Pittsburgh, PA (US); James B. O'Dwyer, Valencia, PA (US); Michael A. Mayo, Pittsburgh, PA (US); Laura E. Poindexter, Pittsburgh, PA (US); John R. Schneider, Glenshaw, PA (US); Michael L. White, Pittsburgh, PA (US); Richard J. Sadvary, Pittsburgh, PA (US); Shiryn Tyebjee, Allison Park, PA (US); Joseph M. Carney, Gibsonia, PA (US); Lawrence G. Anderson, Pittsburgh, PA (US); Dennis A. Simpson, Wexford, PA (US); Thomas R. Hockswender, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 55 days.

(21) Appl. No.: 10/160,888

(22) Filed: Jun. 3, 2002

(65) Prior Publication Data

US 2003/0224174 A1 Dec. 4, 2003

(51) Int. Cl.$^7$ ............................ C08K 3/22; C08K 3/36; C08K 3/38; C08L 33/14
(52) U.S. Cl. ................... 524/588; 523/458; 523/466; 523/467; 524/443; 524/444; 524/589; 524/590; 524/601
(58) Field of Search ................. 524/588, 443, 524/444, 589, 590, 601, 558; 523/458, 466, 467

(56) References Cited

U.S. PATENT DOCUMENTS

| | | | |
|---|---|---|---|
| 4,061,503 A | 12/1977 | Berger et al. ............... 106/300 |
| 4,151,154 A | 4/1979 | Berger ...................... 260/40 R |
| RE30,450 E | 12/1980 | Iannicelli ................ 106/308 N |
| 4,247,708 A | 1/1981 | Tsutumi et al. ............. 556/456 |
| 4,482,656 A | 11/1984 | Nguyen et al. ............. 523/212 |
| 4,522,958 A | 6/1985 | Das et al. ................... 523/212 |
| 4,529,774 A | 7/1985 | Evans et al. ................ 524/860 |
| 4,652,470 A | 3/1987 | Das et al. ................. 427/407.1 |
| 4,677,044 A | 6/1987 | Yamazaki et al. ............ 430/58 |
| 4,844,980 A | 7/1989 | Grüning et al. ............. 428/405 |
| 4,895,887 A | * 1/1990 | Daimon et al. ............. 524/265 |
| 5,021,091 A | 6/1991 | Takarada et al. ....... 106/287.16 |
| 5,190,804 A | * 3/1993 | Seto et al. .................. 428/192 |
| 5,304,243 A | 4/1994 | Yamaguchi et al. ........ 106/490 |
| 5,458,953 A | * 10/1995 | Wang et al. ................ 428/195 |
| 5,472,493 A | 12/1995 | Regan ........................ 106/491 |
| 5,503,935 A | * 4/1996 | Patel .......................... 428/412 |
| 5,653,794 A | 8/1997 | Weber et al. ............... 106/442 |
| 5,686,012 A | 11/1997 | Hayashi et al. .......... 252/62.56 |
| 5,712,325 A | 1/1998 | Lewis et al. .................. 522/83 |
| 5,853,809 A | 12/1998 | Campbell et al. ........ 427/407.1 |
| 5,863,970 A | * 1/1999 | Ghoshal et al. ............. 523/434 |
| 6,013,724 A | * 1/2000 | Mizutani et al. ............. 524/588 |
| 6,022,404 A | 2/2000 | Ettlinger et al. ............. 106/404 |
| 6,117,543 A | 9/2000 | Zaima et al. ................ 428/332 |
| 6,214,106 B1 | 4/2001 | Weber et al. ................ 106/442 |
| 6,355,703 B1 | 3/2002 | Baba et al. .................. 522/182 |
| 6,579,929 B1 | * 6/2003 | Cole et al. ................... 524/492 |
| 6,593,417 B1 | * 7/2003 | Anderson et al. ........... 524/588 |
| 2002/0069790 A1 | * 6/2002 | Hayashi et al. ............. 106/482 |
| 2002/0137872 A1 | * 9/2002 | Schneider et al. ............ 528/44 |

FOREIGN PATENT DOCUMENTS

| | | |
|---|---|---|
| DE | 19533057 | 3/1996 |
| JP | 9-302257 A | * 11/1997 |
| WO | WO94/06835 | 3/1994 |

* cited by examiner

*Primary Examiner*—Robert Sellers
(74) *Attorney, Agent, or Firm*—Diane R. Meyers

(57) ABSTRACT

Liquid coating compositions having improved mar and scratch resistance are disclosed. The coatings generally comprise one or more particles that have been modified to render the particles more surface active. The improved resistance is achieved without affecting the appearance or mechanical performance of the coatings. Methods for using the coatings, and the substrates coated therewith, are also disclosed.

61 Claims, 1 Drawing Sheet

LIQUID COATING OF FILM-FORMING RESIN AND PARTICLES CHEMICALLY MODIFIED TO LOWER SURFACE TENSION

FIELD OF THE INVENTION

The present invention relates to liquid coating compositions that provide improved mar and/or scratch resistance and to methods for using the same. More specifically, the improved resistance is achieved by adding modified particles to a film-forming resin.

BACKGROUND OF THE INVENTION

"Color-plus-clear" coating systems involving the application of a colored or pigmented basecoat to a substrate followed by application of a transparent or clear topcoat over the basecoat have become increasingly popular as original finishes for a number of consumer products including, for example, cars and floor coverings such as ceramic tiles and wood flooring. The color-plus-clear coating systems have outstanding appearance properties, including gloss and distinctness of image, due in large part to the clear coat.

"One coat" systems comprising a one coat color layer are applied themselves as the topcoat. One coat systems are frequently used for household appliances, lawn and garden equipment, interior fixtures, and the like.

Liquid coatings are used in many systems, particularly those wherein solvent emissions are permitted. For example, the coating of elastomeric automotive parts is often done by spraying liquid compositions. Many of these compositions are formulated to be flexible so the coating can bend or flex with the substrate without cracking. Because these coatings can result in films that are softer, they may be more susceptible to marring and scratching.

Topcoat film-forming compositions, such as the protective and/or decorative one coats for household appliances and the transparent clearcoat in color-plus-clear coating systems for automotive applications, are subject to defects that occur during the assembly process and damage from both the environment and normal use of the end product. Paint defects that occur during assembly include the paint layer being too thick or too thin, "fish eyes" or craters, and under-cured or over-cured paint; these defects can affect the color, brittleness, solvent resistance and mar and scratch performance of the coating. Marring and/or scratching can also occur during assembly due to handling of the parts, and particularly during transit of the parts to the assembly plant. Damaging environmental factors include acidic precipitation, exposure to ultraviolet radiation from sunlight, high relative humidity and high temperatures; these factors can also result in compromised performance. Normal use of consumer products will often lead to marring, scratching and/or chipping of the surface due to contact with hard objects, contact with brushes and/or abrasive cleansers during normal cleaning processes, and the like.

Thus, there is a need in the coatings art for topcoats having good scratch and mar resistance, including those in which flexibility would also be desired.

SUMMARY OF THE INVENTION

The present invention is directed to liquid coating compositions generally comprising a film-forming resin in which is dispersed a plurality of chemically modified particles. Particles containing at least one reactive group on their surface are suitable for modification, which is effected by the addition of a moiety that renders the particles more surface active than they would be otherwise; stated another way, the surface tension of the particles is lowered by the present modifications. As a result, the modified particles are more incompatible with the resin than their unmodified counterparts; this is contrary to many art-taught techniques in which particles are treated or reacted with compounds that make them more compatible with, and therefore more easily dispersed in, the resin. Rendering the present particles more incompatible or more surface active causes at least some of the particles to rise to the surface of the cured coating, thus affording enhanced mar and/or scratch resistance.

The particles are typically organic or inorganic particles, or mixtures thereof, and can have an average particle size in the nanometer or micron range. Methods for using compositions comprising modified particles are also within the scope of the invention, as are substrates coated according to these methods.

It has been surprisingly discovered that the incorporation of the present modified particles into a film-forming resin results in coatings having enhanced mar and/or scratch resistance as compared with the same coatings lacking these particles. According to the present invention, coatings can be formulated with these improved mar and/or scratch characteristics without adversely affecting the appearance, viscosity or other mechanical properties of the coatings. Significantly, the flexibility of the cured coating is virtually unaffected by addition of the particles.

"Mar" and "scratch" refer herein to physical deformations resulting from mechanical or chemical abrasion. "Mar resistance" is a measure of a material's ability to resist appearance degradation caused by small scale mechanical stress. "Scratch resistance" is the ability of a material to resist more severe damage that can lead to more visible, deeper or wider trenches. Thus, scratches are generally regarded as being more severe than what is referred to in the art as mar, and the two are regarded in the art as being different. As noted above, mar and scratch can result from manufacturing and environmental factors as well as through normal use. Although mar and scratch are in many respects just differing degrees of the same thing, a coating that improves mar resistance may not be effective in improving scratch resistance, and vice versa. It will be appreciated, therefore, that combinations of modified and unmodified particles and other additives can be employed to give the final coating its desired characteristics. For example, one particle that offers particularly good mar resistance can be coupled with one that offers particularly good scratch resistance. In another example, a treated particle and an untreated particle can be contained to give the desired end performance.

BRIEF DESCRIPTION OF THE FIGURES

FIG. 1 depicts the dispersion of chemically modified particles in the coatings of the present invention, wherein the particles are concentrated in the surface region (FIG. 1A) and evenly dispersed throughout the surface region and bulk region (FIG. 1B).

DESCRIPTION OF THE INVENTION

The present invention is directed to a liquid coating composition comprising a film-forming resin, a plurality of particles dispersed in the resin, and a solvent. The particles have been chemically modified to lower their surface tension. The surface tension of the modified particles is lower than the surface tension of the film-forming resin when cured without the particles. As a result, at least some of the particles migrate to the surface of the coating when deposited as a film. These particles remain at the surface after curing, while other particles remain dispersed throughout the bulk as shown, for example, in FIG. 1. It is believed that this surface migration imparts superior mar and/or scratch resistance to the cured coatings, although the inventors do not wish to be bound by this mechanism.

The present compositions can be formed from film-forming resins that are liquid, that is, water-borne or solvent-borne systems. Any resin that forms a film can be used according to the present invention, absent compatibility problems. Examples of polymers useful in forming the resin include hydroxyl or carboxylic acid-containing acrylic copolymers, hydroxyl or carboxylic acid-containing polyester polymers, oligomers and isocyanate or hydroxyl-containing polyurethane polymers, and amine or isocyanate-containing polyureas. These polymers are further described in U.S. Pat. No. 5,939,491, column 7, line 7 to column 8, line 2; this patent, as well as the patents referenced therein, are incorporated by reference herein. Curing agents for these resins are also described in the '491 patent at column 6, line 6 to line 62. Combinations of curing agents can be used.

The film-forming resin is generally present in the present coating compositions in an amount greater than about 20 weight percent, such as greater than about 40 weight percent, and less than 90 weight percent, with weight percent being based on the total solid weight of the composition. For example, the weight percent of resin can be between 20 and 80 weight percent. When a curing agent is used, it is generally present in an amount of up to 50 weight percent; this weight percent is also based on the total solid weight of the coating composition.

Organic solvents in which the present coatings may be dispersed include, for example, alcohols, ketones, aromatic hydrocarbons, glycol ethers, esters or mixtures thereof. In solvent-based compositions, the solvent is generally present in amounts ranging from 5 to 80 weight percent based on total weight of the composition, such as 30 to 50 percent. Even higher weight percents of solvent can be present in water-based compositions and those that comprise water/cosolvent mixtures.

Any combination of organic or inorganic particles having a functional group can be modified and added to the resin according to the present invention. Examples of particles include but are not limited to silica; various forms of alumina; alumina silicate; silica alumina; alkali aluminosilicate; borosilicate glass; metal oxides including titanium dioxide and zinc oxide; quartz; and zircon such as in the form of zirconium oxide. Particles that do not have an active site can be activated by reacting the particles with water. In the reaction with water, the Si—O—Si bonds on the particle surface will break and, upon the addition of the water molecule, two Si—OH groups will be formed. Examples of particles that need to be activated include nitrides, including boron nitride and silicon nitride; nepheline syenite; buddeluyite; and eudialyte. Mixtures of any of the above particles can be used. In one embodiment, the particles in the coating compositions comprise only one kind of metal oxide.

The silica can be in any suitable form, such as crystalline, amorphous, fused, or precipitated. A silica particle having one or more surface silanol groups is particularly suitable for use in the present invention. For example, the silica particles can have between about 0.5 and 4 mmol surface OH/g of particles.

Alumina can be used in any of its forms, such as alpha, beta, gamma, delta, theta, tabular alumina, and the like. Fused or calcined alumina, including ground or unground calcined alumina, can also be used, but will typically require activation with water first.

The particles listed above are widely commercially available. For example, crystalline silica is available from Reade Advanced Materials; amorphous and precipitated silica from PPG Industries, Inc.; ZEEOSPHERES, silica alumina ceramic alloy particles, from 3M Corporation; colloidal silica from Nissan Chemicals; silica alumina, such as G200, G-400, G-600, from 3M Corporation; alkali alumina silicate, such as W-210, W-410, and W-610, from 3M Corporation; borosilicate glass, sold as SUNSPHERES, from MoSci Corporation; and quartz and nepheline syenite from Unimin, Inc. Other alumina products are available from Micro Abrasives Corporation as WCA3, WCA3S, and WCA3TO, and from Alcoa as TE4-20. Zircon, buddeluyite and eudialyte are commercially available from Aran Isles Corporation, and boron nitride is available from Carborundum Inc. as SHP-605 and HPP-325. It will be appreciated that many commercially available products are actually composites or alloys of one or more materials; such particles are equally within the scope of the present invention.

There are treated particles reported in the art in which the particle is "associated with" one or more coupling agents that affect the properties of the particle. In contrast, the particles used according to the present invention are actually chemically modified by their reaction with a compound having a surface-active moiety; "chemically modified" refers to this reaction. This compound chemically attaches to the surface of the particle by reacting with one or more of the functional groups on the particle. Significantly, the chemical modifications made to particles according to the present invention will be irreversible when used in the present coatings. This is another distinction over modified particles known in the art, whose modifying moieties can subsequently be removed from the particles during normal use. In addition, the modified particles of the present invention can be formulated to retain their quality as individual particles, that is, they do not clump or agglomerate after modification when formulated into a liquid coating.

Compounds having a surface-active moiety and a group that will react with the functional group of the particle should therefore be used. These compounds can have the general Formula 1:

$$F\text{—}L\text{—}Z \tag{1}$$

wherein F is the moiety containing one or more functional groups that will react with the particle surface, Z is a surface-active moiety that decreases the surface tension of the particle, and L is a group that links F and Z. "Surface active" as used herein refers to any compound or moiety that, when attached to the particles used herein, lowers the solid surface tension or surface energy of the particle.

Surface activity can be measured by contact angle measurements or by measuring surface tension (surface tension is inversely proportional to surface activity). The surface tension of an unmodified particle can be compared to the surface tension of the same particle but having a modifying group as described herein. If the modified particle has a lower surface tension than its unmodified counterpart, then it can be concluded that the moiety attached to the particle decreased the surface tension of the particle and is therefore within the scope of the invention. All of the surface tension measurements relevant to the present invention can be done by any means known in the art, such as the Owens-Wendt method using a Rame-Hart Contact Angle Goniometer, the use of which will be familiar to those skilled in the art.

Examples of compounds within general Formula 1 that can be reacted with the present particles to render them more surface active can be represented by Formula 2:

wherein R is an alkyl moiety having 1 to 30 carbons, such as 1 or 2 carbons, Z is, as above, a moiety that decreases the surface tension of the particle to which it is attached, and n is 0, 1 or 2. In comparing Formula 1 to Formula 2, F would be represented by $Si(OR)_3$, L would be represented by $(CH_2)_n$ and Z would, of course, be Z. "Alkyl" refers herein to carbon-containing groups having the specified number of carbon atoms, which groups can be cyclic or aliphatic, branched or linear, substituted or unsubstituted. When compounds having Formula 2 are prepared using hydrosilylation techniques, such as those described herein, "n" will generally be 2 or 3. It will be appreciated that at least one of the alkoxy groups attached to the Si molecule reacts with a functional group on the surface of the particle; in the case of silica particles, the alkoxy group reacts with a silanol group on the particle surface. In one embodiment, Z does not contain any aromaticity and in another embodiment, Z does not have a nitrogen group. The Z moiety can have no functional groups, or can have one or more functional groups. In one embodiment, two or more functional groups are present in the Z moiety. The functional groups, if present, can be selected, for example, based on their ability to react with the crosslinker used in the resin formation. This can provide retained mar and/or scratch resistance because the particle will covalently bond with the resin/crosslinker at the surface of the coating. For certain applications, such reaction may be undesirable and the Z moiety does not contain any functional or reactive group.

Any Z moiety can be used according to the present invention, and will generally fall into one of three categories: a long chain alkyl group; a fluorocarbon-containing material; and a silane to which is attached at least two methyl groups. "Long chain" as used in this context refers to four or more carbon atoms, and a fluorocarbon-containing material refers to a material comprising at least one $CF_3$ group. The long chain alkyl group can be linear or branched. The Z moiety can be introduced to the particle in any manner known in the art. For example, the Z moiety may be part of a compound that, by itself, reacts with the particle, (i.e. contains an F moiety) such as a compound that contains a trialkoxy silane.

Alternatively, a compound containing a Z moiety can be reacted with another compound that contains an F moiety. This can be done by any means known in the art, by selecting the appropriate L moiety to bring together the F and Z moieties. For example, a trialkoxy silane wherein the fourth substituent has a first functional group can be reacted with a compound containing both a "Z" moiety and a second functional group; the first and second functional groups are selected so as to be reactive with each other. Upon reaction, the F and Z moieties are united. Any pair of functional groups can be used. For example, if one functional group is an epoxy, the other can be an amine, a carboxylic acid or a hydroxy; if one functional group is an amine, the other can be an epoxy, isocyanate or carboxylic acid; if one functional group is an isocyanate, the other can be an amine or hydroxy; and if one functional group is an acrylate, the other can be an amine. Specific examples include the reaction of glycidyloxytrimethoxy propylsilane ("A-187") with a (di) alkylamine or A-187 with stearoyl sarcosine.

Examples of compounds having long alkyl chains are those within Formula 2, wherein Z is $-(CH_2)_{n1}-CH_3$, and $n_1$ is 1 to 30, such as 7 to 17. In this embodiment, the total of n and $n_1$ is three or greater. Specific examples include octyltrimethoxy silane, octyltriethoxy silane, and octadecyltriethoxy silane. In another particular embodiment within Formula 2 that introduces a long alkyl chain, Z is $n_2$ is 1 to 3 and $R_1$ and $R_2$ are the same or different and $R_1$ can be hydrogen or an alkyl group having 1 to 30 carbons and $R_2$ is an alkyl group having 4 to 30 carbons. For example, $R_1$ can be H and $R_2$ can be $C_6H_{13}$, $C_8H_{17}$ or $C_{12}H_{25}$, or both $R_1$ and $R_2$ can be $(C_4H_9)$. It will be appreciated that this embodiment also introduces functional groups into the "F—L—Z" compound.

Examples of compounds having fluorocarbon-containing moieties include but are not limited to those having Formula 2 above, wherein n is 1 or 2, Z is $-(CF_2)_m-F_3$ and m is 0 to 30, such as 7. Perfluoro alkyl trialkoxy silanes fall within this category, such as perfluorooctyl triethoxy silane, fluoropropyltrimethoxy silane, and perfluorodecyl triethoxy silane.

Examples of compounds having dimethylsilane moieties include those of Formula 2, wherein n is zero, Z is $-(CH_2)_{n3}-(Si(CH_3)_2)-O)_{m1}-Si(CH_3)_3$, $n_3$ is 0 to 17, such as 2, and $m_1$ is between 1 and 50, such as between 1 and 10. It will be appreciated that the present invention is not limited to any of the examples listed above. In addition, combinations of F—L—Z compounds can be used so as to attach more than one kind of surface active moiety to the particle.

The modification of the present particles is performed by means standard in the art. If the particles do not have surface functionality, they are first treated with a small amount of water (i.e. about 1%) to activate the surface by formation of Si—OH groups on surface. The small amount of water used in the treatment will react with the particle and there will be substantially no water left. The particles having surface functional groups are reacted with the one or more silylating reagents at slightly elevated temperatures (i.e. about 60° C.) in the presence of a catalyst, such as dibutyltinlaurate, for at least about two hours. Typically, between about 0.1 and 5.0 weight percent of catalyst is added, such as 1 percent. Alternatively, the particles and silylating reagent can be admixed with a small amount of water and warmed at elevated temperatures (such as about 120° F.) overnight (such as 14 plus hours). Generally, between about 1 and 100 percent, such as between about 20 and 100 percent, of the surface functional groups on the particle will react with the silylating reagent. The "silylating reagent(s)" refers to the F, F—L, or F—L—Z compound, depending on how the reaction is performed, that is reacted with the particle. For example, an F or F—L containing compound can be reacted first with the particle, with the L—Z or Z containing compound added later. Alternatively, the F—L—Z compound can be reacted directly with the particle; this embodiment is typically more desirable as it provides a more stable particle. The silylating reagent can be added in amounts of 1, 5 or up to about 10 weight percent or even greater, with weight percent being based on the total weight of the silica.

In embodiments wherein a trifluoroalkyltrialkoxy silane compound is being reacted with the particle, for example, a trifluoroalkyl compound and trialkoxysilane compound can be reacted first, with the reaction product (i.e. the F—L—Z compound) being subsequently reacted with the particle. Alternatively, the particle can be reacted with the trialkoxy silane first, with the fluoro compound reacted onto the silane after it is attached to the particle.

The result of the present modification is to lower the surface tension of the particle being modified. According to the invention, the surface tension of the modified particles is lower than the surface tension of the film-forming resin into which they are placed. For purposes of comparing surface tensions of the particle and the resin, the surface tension of the cured film-forming resin is measured without the present particles or any other additives that would affect the surface tension reading; it is this surface tension measurement that is compared to the surface tension measurement of the modified particle itself. As a result of adding particles having a surface tension lower than that of the film-forming resin, the surface tension of the present compositions as a whole is also lowered. The present invention is therefore further directed to a method for lowering the surface tension of a cured coating by adding to the uncured coating composition a particle whose surface tension is lower than the surface tension of the cured coating without the particle.

Some of the particles that can be modified according to the present invention already contain some form of surface treatment applied by the supplier. Examples include MIBK-ST, which is a colloidal silica in MIBK solvent, and MEK-ST, a colloidal silica in MEK solvent, both of which are commercially available from Nissan. Such particles, however, typically have a surface tension higher than the surface tension of the film-forming resins useful for forming coatings. The present modifications serve to lower the surface tension of the commercially available particles to levels that make them suitable for use in the present invention, regardless of whether the particles have already received some surface treatment from the supplier.

Figure 1A:
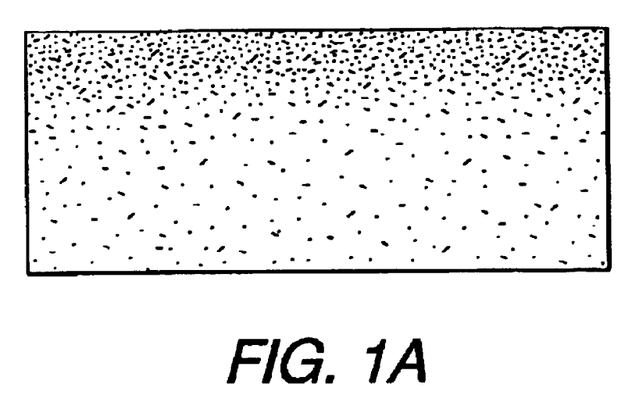
Figure 1B:
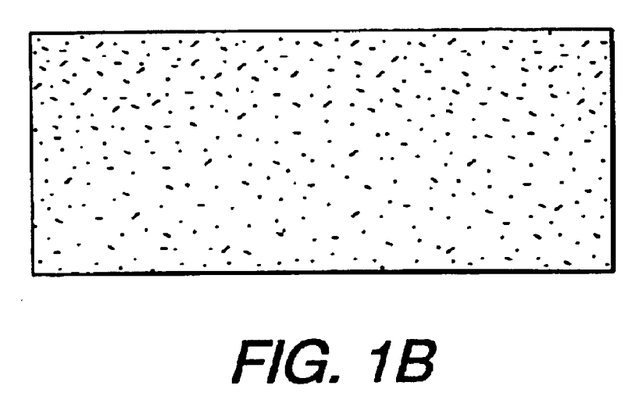

As a result of the lower surface tension, at least some of the present modified particles will migrate to the surface region of the liquid coatings and remain there during and after cure. The degree to which the particles migrate will depend upon a variety of factors including, but not limited to, the type of surface treatment, the type of resin, and other additives in the resin. In some embodiments, the surface region of the cured coating will have a higher concentration of particles than will the bulk region of the cured composition, as depicted in FIG. 1A. In other embodiments the surface-active particles will be more evenly dispersed throughout the surface region and bulk region as depicted in FIG. 1B; in this embodiment, it will be understood that a portion of the modified particles have migrated to the surface.

As discussed above, the migration of the present particles is a result of their having been modified with the F—L—Z compound. This compound serves to make the present particles more incompatible with the resin than they would be in their unmodified form. This novel approach is quite different from other modified particles known in the art, which are typically modified to make them more compatible with the resin, rather than less. Because they are compatibilized with the resin, they do not typically rise to the surface of the coating. These particles are made to have a surface tension higher than or as close as possible to that of the resin. In contrast, the surface tension of the present particles are made lower than the surface tension of the resin. Other particles reported in the art are designed to have functional groups that will bind the particles once dispersed throughout the resin; the particles are designed to "stay in" and react with the resin or crosslinker, and not migrate to the surface.

When functional groups are included in the present particles, in contrast they do not bind with the resin until after they have migrated to the surface, and then only if the functional groups in the particles are reactive with the functional groups on the resin or crosslinker. Thus, the present particles are quite distinct from other particles reported in the art.

A "cured composition" will be understood as referring to one in which the components react with each other so as to resist melting upon heating. The "surface region" of a cured coating is used herein to refer to the top quarter of a coating. In contrast, the "bulk region" of the cured composition refers to that portion below the surface region, extending from the interface with the surface region to the substrate or to the next layer of coating beneath the cured coating containing the modified particles, generally about three quarters of the total coating thickness.

The concentration of particles can be determined, for example, by a variety of surface analysis techniques well known in the art, such as Transmission Electron Microscopy ("TEM"), Surface Scanning Electron Microscopy ("X-SEM"), Atomic Force Microscopy ("AFM"), and X-ray Photoelectron Spectroscopy, the use of which will be familiar to one skilled in the art. It will be apparent when looking, for example, at a micrograph of the present coatings, that at least some particles will have migrated to the surface region.

It should be understood that the particles can be present in the surface region such that a portion of the particles at least partially protrudes above the cured coating surface, essentially unprotected by an organic coating layer. Alternatively, the particles can be present in the surface region such that the particles are wholly covered by the resin.

The particles used in the present invention can have an average particle size ranging in the nanometer to microrange. "Nanoparticles" can be used in a size range of between about 2.0 and 500 nanometers, such as between about 5 and 200 nm. "Microparticles" can be used in a size range of between about 0.5 and 50 microns, such as greater than 1 micron to 30 microns, 0.5 to 10 microns or 0.5 to 5 microns. Any of the particles listed above can be used in any size within these ranges according to the present invention.

Particle size can be determined according to any method known in the art, such as by a conventional particle size analyzer. For example, where the average particle size is greater than 1 micron, laser scattering techniques can be employed, and for average particle sizes smaller than 1 micron, TEM can be used.

The shape or morphology of the particles can vary depending on the type of particle or particles selected. For example, generally spherical particles, such as crystalline materials, solid beads, microbeads, or hollow spheres, can be used, as can particles that are platy, cubic or acicular (that is, elongated or fibrous). The particles can also have a random or nonuniform morphology. In addition, the particles can have an internal structure that is hollow, porous or void free, or any combination, such as a hollow center with porous or solid walls. It will be appreciated that for certain applications, one particle shape may be more suitable than others. Particle shape may be irrelevant, however, for other applications. It will be appreciated that combinations of particles having different morphologies can be used to give the desired characteristics to the final coating.

Combinations of particles can also be used to impart the desired level of mar and/or scratch resistance to a coating. For example, nanosized particles that are particularly good for imparting mar resistance and microparticles that are particularly good for imparting scratch resistance can be combined. To determine whether improved mar and scratch resistance is obtained with a particular particle or combination of particles, two coating compositions can be formulated, with the only difference being that one contains the present modified particles and one does not. The coatings can be tested for mar and scratch resistance (i.e. "mar and/or scratch testing") by any means standardly known in the art, such as those described in the Example section below. The results for the particle-containing and nonparticle-containing compositions can be compared to determine whether improved resistance is obtained when the selected particles are added. Even a small improvement in any of these tests constitutes an improvement according to the invention. Accordingly, the present compositions, when cured, will have greater mar and/or scratch resistance than their particle-lacking counterparts. Gloss retention percentages of 20 percent or greater, 50 percent or greater, or even 70 percent or greater can be achieved according to the present invention.

In addition to excellent mar and/or scratch resistance, some embodiments of the present compositions, when cured as a coating, have excellent flexibility. Example 3 provides some formulations that have both mar and/or scratch resistance and good flexibility. The coatings can be tested for flexibility ("i.e. flexibility testing") by any means standard in the art, such as that described in the Example section below. Flexibility as measured by this testing is typically reported on a scale of 0 to 10, with 10 being the best; "flexibility" as used herein refers to performance in flexibility testing based on this scale. The 0 to 10 scale is further described in the Example section. The flexible coatings of the present invention typically and consistently exhibit a flexibility of about 6 or greater, when flexibility is measured at 70° F. It was surprising that coatings containing particles and having such excellent mar and/or scratch resistance would also have such excellent flexibility. Typically, coatings that are formulated to be flexible (i.e. flexibility of 6 or greater) are very soft and therefore not very resistant to marring and/or scratching. Accordingly, the present invention is further directed to a cured coating having a gloss retention after mar and/or scratch testing of 38 percent or greater and a flexibility of 6 or greater, such as 55 percent or greater or 75 percent or greater with a flexibility of 8 or greater.

The particles are typically present in the curable coating composition of the present invention in an amount ranging from 0.01 to 20.0 weight percent, such as an amount ranging from 0.01 to 10 weight percent, and often are present in an amount ranging from 0.01 to 8 weight percent where weight percent is based on total solid weight of the coating composition. For clearcoat applications and/or where clarity is important, a weight percent of 0.01 to 5 or 1 to 3 is particularly suitable. For pigmented systems, a weight percent of 2.0 to 11.0 is particularly suitable. It will be appreciated that improvement in mar and scratch resistance will increase as the concentration of particles increases. The tests described in the Example section below can be used by those skilled in the art to determine what weight percent or "load" of particles will give the desired level of protection.

Both the size of the particles used as well as the particle load can affect not only the level of mar and/or scratch resistance but also the appearance of the cured coating. Thus, particle size and load should be optimized by the user based on the particular application, taking into account, for example, the level of acceptable haze, the level of mar and/or scratch resistance, the thickness of the coating and the like. Where appearance is particularly relevant, such as in an automotive clear coat, a relatively low load and particle size can be used. A load of less than 5 weight percent, even less than 1 weight percent and a particle size between about 3 to 6 microns is particularly suitable. For industrial one-coat systems where haze is not as relevant, or where other pigments are present, loadings of up to about 10 percent or even higher can be used, as can particle sizes of 10 microns or even larger. One skilled in the art can optimize particle size and load to achieve the desired level of mar and/or scratch resistance without compromising the appearance or other mechanical properties of the cured coatings. Mixtures of particles having different sizes may be particularly suitable for a given application.

Haze can also be minimized to at least some degree by selecting resins and particles that have a similar refractive index ("RI"), that is the difference between the resin RI and the particle RI ("Δ RI") is minimized. In some applications, such as for clear coats, the Δ RI can be less than one, or even less than 0.1. Using a combination of particles having different RI's can also help to reduce haze. Minimizing Δ RI is particularly relevant when the particles are larger in size (i.e. greater than about 6 microns) and/or the particle load is greater than about 2 weight percent, such as greater than about 8 weight percent.

The liquid compositions of the present invention can contain conventional additives, such as plasticizers, antioxidants, light stabilizers, UV absorbers, thixotropic agents, anti-gassing agents, organic cosolvents, biocides, surfactants, flow control additives and catalysts. Any such additives known in the art can be used, absent compatibility problems.

The particles of the present invention can be added at any appropriate time during the formulation of the liquid coating. The appropriate time can vary depending on such parameters as the type of particle, the type of modification, the type of resin and the other formulation additives. One skilled in the art of formulation can determine how and when to add the particles based on these parameters. Typically, the particles will be added to a solvent, after which the other ingredients will be added.

The liquid compositions of the invention can be applied by any conventional method such as brushing, dipping, flow coating, roll coating, conventional and electrostatic spraying. Spray techniques are most often used. Typically, film thickness for liquid coatings can range between 0.1 and 5 mils, such as between 0.5 and 3 mils, or about 1.5 mils.

Several liquid formulations can be cured at ambient temperature, such as those using a polyisocyanate or polyanhydride curing agent, or they can be cured at minimally elevated temperatures to hasten the cure. An example would be forced air curing in a down draft booth at about 40° C. to 60° C., which is common in the automotive refinish industry. The ambient temperature curable compositions are usually prepared as a two (2) package system ("2K") in which the ambient curing agent ("ambient curing agent pack") is kept separate from the film-forming resin ("resin pack") containing the reactive functional group. The packages are combined shortly before application. In one embodiment of the present invention, an aminoplast curing agent is added to the resin pack of the 2K system. It will be appreciated that the aminoplast will not cure at ambient temperatures, and its mixture with the resin pack will therefore not be a problem. Following mixture of this resin pack with the ambient curing agent pack, and application of the resulting mixture on a substrate, the substrate can then be thermally treated to facilitate cure of the aminoplast with the resin; such cure conditions will be well known to those skilled in the art. Thus, a dual cure with both the aminoplast and ambient curing agent is achieved. Aminoplasts are commercially available. A particularly suitable aminoplast is melamine, such as those commercially available from Cytec Industries, Inc. in their CYMEL line.

The thermally curable liquid compositions such as those using blocked isocyanate, aminoplast, phenoplast, polyepoxide or polyacid curing agent can be prepared as a one-package system ("1K"). These compositions are cured at elevated temperatures, typically for 1 to 30 minutes at about 250° F. to about 450° F. (121° C. to 232° C.) with temperature primarily dependent upon the type of substrate used. Dwell time (i.e., time that the coated substrate is exposed to elevated temperature for curing) is dependent upon the cure temperatures used as well as wet film thickness of the applied coating composition. For example, coated automotive elastomeric parts require a long dwell time at a lower cure temperature (e.g., 30 minutes at 250° F. (121° C.), while coated aluminum beverage containers require a very short dwell time at a very high cure temperature (e.g., 1 minute at 375° F. (191° C.)). 1K systems can also be cured by exposure to actinic radiation, such as UV light or electron beam.

The coating compositions of the invention can be applied to a variety of substrates, for example automotive substrates such as fenders, hoods, doors and bumpers, and industrial substrates such as household appliances, including washer and dryer panels and lids, refrigerator doors and side panels, lighting fixtures and metal office furniture. Such automotive and industrial substrates can be metallic, for example, aluminum and steel substrates, and non-metallic, for example, thermoplastic or thermoset (i.e. "polymeric") substrates, including, for example, transparent plastic substrates, polycarbonate, polymethyl methacrylate and elastomeric substrates such as thermoplastic polyolefin. Wood substrates are also suitable for coating with the present compositions.

The coating compositions of the invention are particularly useful as top coats and/or clear coats in color-clear composite coatings. The compositions of the invention in the pigmented form can be applied directly to a substrate to form a color coat. Alternately, the coating composition of the invention can be unpigmented, in the form of a clearcoat for application over a color coat (either a primer coat or a colored topcoat). When used as a color topcoat, coating thicknesses of about 0.5 to 5.0 mils are usual, and when used as a clearcoat, coating thicknesses of about 1.0 to 4.0 mils are generally used.

Accordingly, the present invention is further directed to a substrate coated with one or more of the present compositions. The substrates and compositions, and manner of applying the same, are as described above.

The present invention is further directed to a multi-layer composite coating composition comprising a base coat deposited from a film-forming composition and a topcoat applied over at least a portion of the base coat, where the topcoat is deposited from any of the coating compositions of the present invention. The base coat might have a cured film thickness between about 0.5 and 4 mils while the topcoat cured film thickness can be up to 10 mils. The base coat can be cured before application of the topcoat, or the two coats can be cured together. In one example, the base coat can be deposited from a pigmented film-forming composition, while the topcoat formed from the present compositions is substantially transparent. This is the color-plus-clear system discussed above, frequently used in automotive applications. In another example, more than one of the layers can contain the particles of the present invention.

In yet another embodiment, the present invention is directed to a method for improving the mar and/or scratch resistance of a coated substrate comprising applying the present compositions to at least a portion of the substrate. Application can be by any means known in the art to the thicknesses described above.

The coatings formed according to the present invention, when cured, can have outstanding appearance properties and scratch and mar resistance properties as compared to no particles being present.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

For all of the Examples, unless otherwise noted, 20° gloss was measured with a handheld 20° NOVO-GLOSS 20 statistical glossmeter, available from Gardener Instrument Company, Inc.

BON AMI Mar Resistance ("BON AMI") was performed using an Atlas AATCC Mar Tester Model CM-5, available from Atlas Electrical Devices Co. of Chicago, Ill. Using a felt cloth clamped to the acrylic finger on the arm of the instrument, a set of 10 double rubs (unless indicated otherwise) was run on each panel, which was coated with BON AMI cleanser. The panel was then rinsed with cool tap water and dried. Mar resistance was expressed as a percentage of the 20° gloss that was retained after the surface was marred by the mar tester. Mar resistance was measured as: Percent Mar Resistance=(Marred Gloss÷Original Gloss)×100.

1, 2, and 9 $\mu$ 3M Abrasive Paper Scratch Resistance ("1, 2 or 9$\mu$ Paper") also was performed using the Atlas Tester. A 2"×2" piece of the 3M Abrasive Paper backed with the felt cloth was clamped to the acrylic finger on the arm of the instrument, and a set of 10 double rubs (unless indicated otherwise) was run on each panel. The panel was then rinsed with cool tap water and dried. Scratch resistance was expressed as the percentage of the 20° gloss that was retained after the surface was scratched by the scratch tester. Scratch resistance was measured as: Percent Scratch Resistance=(Scratched Gloss÷Original Gloss)×100.

BYK Gardner haze was measured using the BYK/Haze Gloss Instrument following manufacturer's instructions.

The Amtec Kistler Car Wash Test was performed by first applying and curing a colored coat and a clear coat to steel substrate panels. The panels were placed in the Amtec car wash machine from Amtec Kistler, Germany, which simulates car wash machines used in Europe. A moving platform transported the panels under a rotating polyethylene brush (two passes under the brush=one cycle) while a water/quartz meal mixture (silicon dioxide or quartz, 1.5 grams per liter) was sprayed at the panels. Twenty degree gloss meter readings were recorded before and after the test.

Results of these tests are presented in the tables below, both in terms of the gloss readings before and after the various tests, and as the percent gloss retention.

For flex testing ("flexibility"), a 1 inch×4 inch (2.54 cm×10.16 cm) piece was cut from the coated test panel. The piece was subjected to a bend around a ½ inch (1.27 cm) diameter steel mandrel, such that the two ends of the 4 inches long (10.16 cm) test piece contacted one another. Flexibility was evaluated at 70° F. (21.1° C.). The rating scale is from 0 to 10. A '10' consists of no paint cracking. A '9' has less than five interrupted short-line cracks. An '8' has interrupted line cracks with a maximum of four uninterrupted line cracks. A '6' has five to ten uninterrupted line cracks. A '4' has more than 15 uninterrupted line cracks. A '0' is fracture of the substrate.

Example 1

Various surface tension measurements for various particles and coatings were performed as indicated in Table 1 to demonstrate the present invention. Contact angle measurements, both with water and methylene iodide, were made using the Rame-Hart Contact Angle Goniometer. Surface tension calculations were done using the Owens-Wendt method.

TABLE 1

| | Contact Angle ($H_2O$) | Contact Angle $CH_2I_2$ | Dispersive S.T. Dynes/cm | Polar S.T. Dynes/cm | Total S.T. Dynes/cm |
|---|---|---|---|---|---|
| MIBK-ST[1] | 36.3 | 22.5 | 35.5 | 17.2 | 52.7 |
| MIBK-ST + 5% Octyltriethoxy-silane (OTES)[2] | 93.5 | 41.5 | 38.4 | 0.5 | 38.9 |
| MIBK-ST + 5% fluorinated triethoxysilane[3] | 96 | 69 | 21.7 | 2.3 | 24 |
| 2K control[4] | 79 | 21 | 45 | 2.8 | 47.8 |
| 2K control + 2 wt % Particle 4 | 88.3 | 25.6 | 41.1 | 0.6 | 41.7 |
| 2K control + 2 wt % Particle 2 | 92.3 | 29.9 | 39.2 | 0.3 | 39.5 |
| 1K control[5] | 89.8 | 42.8 | 38.0 | 1.8 | 39.8 |
| 1K + MIBK-ST | 83.5 | 31 | 41.9 | 2.1 | 44.0 |
| 1K control + 2 wt % Particle 4 | 94.5 | 48.8 | 32.1 | 0.5 | 32.6 |
| 1K control + 2 wt % Particle 2 | 101.5 | 57.5 | 28.9 | 0.3 | 29.2 |

[1]nanoparticles identified as Particle 1, Table 2.
[2]nanoparticles identified as Particle 4, Table 2.
[3]nanoparticles identified as Particle 2, Table 2.
[4]2K formulation prepared as described in Example 3.
[5]1K formulation prepared as described in Example 5.

As seen in the table, the surface tension of the unmodified MIBK-ST (52.7) was higher than the surface tension of the cured 2K and 1K coatings lacking particle (47.8 and 39.8, respectively). The present modifications reduced the surface tension of the MIBK-ST from 52.7 to 38.9 and 24, for two different modifications. It will be noted that the surface tension measurements for the modified particles, 38.9 and 24, are lower than the surface tension measurements for the coatings lacking particle (47.8 and 39.8). These modified particles are therefore suitable for use with these resins to form the coating composition of the present invention. As further illustrated in the table, the addition of the present particles served to lower the surface tension of the cured coating; for the 2K example, the surface tension was lowered from 47.8 to either 41.7 or 39.5 and for the 1K example the surface tension was lowered from 39.8 to 32.6 or 29.2. In comparison, the unmodified particles having a surface tension of 52.7, when added to the 1K control having a surface tension of 39.8, served to increase the surface tension of the cured coating containing the particles to 44.0.

Example 2

Surface-modified silica nanoparticles (Particles 1 to 17) were prepared by reacting 30 percent silica colloidal dispersions in ketones (MEK, MIBK, MAK) with 5 to 10 percent of the surface active alkoxysilane or alkoxysiloxane, in the presence of 1 to 2 percent dibutyltindilaurate (DBTDL) as catalyst, for 2 to 6 hours, at 60° C., according to Table 2. The nanoparticles were obtained from Nissan. Particle 18, a microparticle, was prepared by dispersing 5 to 10 weight percent of the particle in MIBK solvent and then following the same procedure for reaction with the surface active moiety as described for the nanoparticles.

TABLE 2

| Particle # | Treatment | Particle Type | Reaction Time (hrs) |
|---|---|---|---|
| 1 | Control (no modification) | 30% silica nanoparticles in MIBK | — |
| 2 | 5% perfluorooctyl-triethoxysilane | 30% silica nanoparticles in MIBK | 2 |
| 3 | 5% Perfluorooctyl-triethoxysilane + glycidyloxytrimethoxy-propylsilane ("A-187") | 30% silica nanoparticles in MIBK | 3 |
| 4 | 5% Octyltrimethoxysilane | 30% silica nanoparticles in methanol | 4 |
| 5 | 5% Octyltrimethoxysilane + A-187 | 30% silica nanoparticles in MIBK | 6 |
| 6 | 5% A-187 + stearoyl sarcosine | 30% silica nanoparticles in MIBK | 2 |

TABLE 2-continued

| Particle # | Treatment | Particle Type | Reaction Time (hrs) |
|---|---|---|---|
| 7 | 5% aminopropyltriethoxy-silane + epoxy eicosane | 30% silica nanoparticles in MIBK | 2 |
| 8 | 5% ethylheptamethyldi-siloxanetrimethoxy silane | 30% silica nanoparticles in MIBK | 2 |
| 9 | 5% Bis(2-dihydroxy-ethyl)-3-aminopropyl-trimethoxysilane | 30% silica nanoparticles in MIBK | 2 |
| 10 | 5% Bis(2-dihydroxy-ethyl)-3-aminopropyl-trimethoxysilane + 5% ethylheptamethyldi-siloxanetrimethoxy silane | 30% silica nanoparticles in MIBK | 2 |
| 11 | 5% perfluorooctyltriethoxy-silane + 5% reaction product of isocyanatopropyltri-methoxysilane and 4-hydroxy, 2,2,6,6 tetramethylpiperidine | 30% silica nanoparticles in MIBK | 2 |
| 12 | Control (no modification) | 30% silica nanoparticles in MEK | — |
| 13 | 5% methyl trimethoxysilane | 30% silica nanoparticles in MEK | 2 |
| 14 | 5% fluoropropyltrimethoxy-silane | 30% silica nanoparticles in MEK | 2 |
| 15 | 5% octadecyltriethoxysilane | 30% silica nanoparticles in MEK | 2 |
| 16 | 5% perfluoroalkyltriethoxy-silane | 30% silica nanoparticles in MIBK | 2 |
| 17 | A-187 + perfluorinated amine | 30% silica nanoparticles in MIBK | 2 |
| 18 | 5% perfluorotriethoxysilane | GORESIL 25 | 4 |

Example 3

Particles prepared as described in Example 2 were formulated into the resin-containing portion of a flexible, two-pack liquid coating system, the components of which are listed in grams in Table 3. The UV absorber and treated nanoparticles were added sequentially to the solvents followed by addition of all of the remaining components.

Sequel 1440 plaques (TPO plastic) were coated with MPP4100D adhesion promoter from PPG to a target dry film thickness ("DFT") of 0.2 to 0.3 mils, air dried for 30 minutes, coated with CBCK8555A black, (a melamine hydroxyl basecoat from PPG), flashed at ambient temperature for 90 seconds, coated with a second coating of CBCK8555A to a total target DFT of 0.8 to 1.0 mils, flashed at ambient temperature for 90 seconds, coated with one of Samples 22 to 26 to a target DFT of 1.5 to 1.8 mils by applying two coats with a 90-second ambient flash between coats and at 10 minutes ambient flash before bake, and baked at 250° F. for 40 minutes. The samples were applied by spraying within 15 minutes of mixing the resin pack and crosslinker pack of the two-pack system. The panels were not washed prior to determining the 20° gloss reading.

TABLE 3

| Resin Pack | Sample 1 | Sample 2 | Sample 3 | Sample 4 | Sample 5 |
|---|---|---|---|---|---|
| Solvent A[6] | 45 | 45 | 45 | 45 | 45 |
| Solvent B[7] | 30 | 30 | 30 | 30 | 30 |
| UV Absorber[8] | 3.0 | 3.0 | 3.0 | 3.0 | 3.0 |
| Particle 12 | — | 6.67 | — | — | — |
| Particle 13 | — | — | 6.67 | — | — |
| Particle 14 | — | — | — | 6.67 | — |
| Particle 15 | — | — | — | — | 6.67 |

TABLE 3-continued

| Resin Pack | Sample 1 | Sample 2 | Sample 3 | Sample 4 | Sample 5 |
|---|---|---|---|---|---|
| Acrylic polyol[9] | 88.8 | 88.8 | 88.8 | 88.8 | 88.8 |
| Polyester polyol[10] | 11.9 | 11.9 | 11.9 | 11.9 | 11.9 |
| Acid Catalyst[11] | 0.21 | 0.21 | 0.21 | 0.21 | 0.21 |
| Light Stabilizer[12] | 1.1 | 1.1 | 1.1 | 1.1 | 1.1 |
| Polybutylacrylate[13] | 0.50 | 0.50 | 0.50 | 0.50 | 0.50 |
| Crosslink Pack Isocyanate[14] | 37.20 | 37.20 | 37.20 | 37.20 | 37.20 |
| Initial gloss | 84 | 81 | 81 | 82 | 82 |
| 9μ paper | 12 | 32 | 65 | 45 | 63 |
|  | 14% | 38% | 80% | 55% | 77% |
| Flexibility | 8 | 8 | 8 | 8 | 6/8 |

[6]Methyl n-amyl ketone.
[7]Ethyl 3-ethoxypropionate
[8]TINUVIN 328, UV absorber from Ciba Geigy.
[9]Acrylic resin: 34.8% hydoxylethylmethacrylate/23.4% 2-ethylhexyl methylacrylate/20.8% 2-ethylhexyl acrylate/20.0% stryene/1.0% methacrylic acid -- 60% solids in n-butyl acetate and methyl ether propylene glycol acetate with a Mw around 6700.
[10]Polyester resin: 23.0% 1,6 hexane diol/18.6% trimethylol propane/8.3% trimethyl pentanediol/18.5% Adipic Acid/31.8% 4-methylhexahydrophthalic anhydride -- 80% solids in n-butyl acetate with a Mw around 5000.
[11]Phenyl acid phosphate acid catalyst from Koch Chemicals.
[12]TINUVIN 123 hindered amine light stabilizer from Ciba Geigy.
[13]A flow control agent at 62% solids in xylene with a Mw around 6700.
[14]DES N 3300 isocyanate HDI trimer from Bayer Corporation.

The samples containing the particles of the present invention (Samples 3, 4, 5) had better mar and scratch resistance than controls with unmodified particles (Sample 2) and no particles (Sample 1). In addition, the samples of the present invention had flexibility comparable to the samples with unmodified or no particles. Thus, the present invention provides coatings that combine both flexibility and mar and/or scratch resistance.

Example 4

Samples 6 through 14 were prepared as generally described in Example 3 using Particles 1 to 9, respectively. All of these samples contained the following components in grams:

TABLE 4

| | |
|---|---|
| Solvent A | 35 |
| Solvent B | 15 |
| Particle | 6.67 |
| Acrylic Polyol | 109.5 |
| Isocyanate | 34.3 |

Cold rolled steel panels treated with ED5000, a conductive electrodeposition coating from PPG, were obtained from ACT Laboratories as APR 22986. Samples 6 through 14 were then applied by drawdown to a target DFT of 1.5 to 1.8 mils using an 8 path Wet Film Applicator#14, from Paul N. Gardner Company, Inc., ambient flashed for 10 minutes, and baked for 40 minutes at 250° F. Nine micron paper scratch testings were performed. Samples 7 through 11 were further tested on Sequel 1440 plaques, prepared and tested as described in Example 3. Results are presented in Table 5. Samples 7 through 14 using particles modified according to the present invention showed much better gloss retention than the control lacking the particles (Sample 6).

The samples tested on plaques (Samples 7 through 11) showed good gloss retention.

TABLE 5

| | STEEL PANELS | | | SEQUEL 1440 PLAQUES | | |
|---|---|---|---|---|---|---|
| Sample | Original Gloss | 9μ Paper | % Retention | Original Gloss | 9μ Paper | % Retention |
| 6 | 86 | 22.5 | 26% | — | — | — |
| 7 | 86 | 62.5 | 73% | 81 | 47.5 | 59% |
| 8 | 86 | 64.5 | 75% | 84 | 62.0 | 74% |
| 9 | 86 | 49 | 57% | 85 | 65.5 | 77% |
| 10 | 86 | 69 | 83% | 84 | 63.5 | 76% |
| 11 | 86 | 71.5 | 83% | 85 | 57.5 | 68% |
| 12 | 86 | 65.5 | 76% | — | — | — |
| 13 | 86 | 51 | 59% | — | — | — |
| 14 | 86 | 65.5 | 76% | — | — | — |

Example 5

Clearcoat formulations (Samples 15 through 17) suitable for use in a one pack ("1K") rigid coating system were prepared using the components in grams shown in Table 6. Each component was mixed sequentially with agitation. Steel panels treated with ED5051, a conductive electrodeposition coating from PPG, were obtained from ACT as APR28215. The panels were coated and tested with basecoat and the present samples as generally described in Example 4, but with a bake time of 30 minutes rather than 40, and at a temperature of 285° F. rather than 250° F. Percent Gloss retention was higher with the samples prepared according to the present invention (Samples 16 and 17) as compared with control (Sample 15).

TABLE 6

| | Sample 15 | Sample 16 | Sample 17 |
|---|---|---|---|
| Methyl N-Amyl Ketone | 30.0 | 30.0 | 30.0 |
| Particle 16 | — | 6.7 | — |
| Particle 17 | — | — | 6.7 |
| Acrylic resin[15] | 89.7 | 89.7 | 89.7 |
| Crosslinker[16] | 43.8 | 43.8 | 43.8 |
| Catalyst[17] | 1.3 | 1.3 | 1.3 |
| Initial gloss | 93 | 90 | 91 |
| 9μ paper | 60 | 83 | 82 |
| | 65% | 92% | 90% |

[15]Acrylic resin: 40% hydroxypropylacrylate; 18.5% n-butyl methacrylate; 19% n-butyl acrylate; 20% styrene; 0.5% methylmethacrylate; 2.0% acrylic acid - 71% solids in xylene and Aromatic 100 (Exxon).
[16]CYMEL 202 melamine, Cytec Industries, Inc.
[17]Phenyl acid phosphate catalyst 75% solution in n-butanol.

Example 6

Two-pack coatings were prepared using the components and amounts (in grams) shown in Table 7. Sample 18 was a control sample containing no particles; this commercially available product was comprised of four volumes of CONCEPT urethane clear DCU2021, one volume of DCX8 high solids hardener and one volume of DT885 thinner. Samples 19 through 23 were prepared according to the present invention. Briefly, each of the packs (Part A and Part B) were prepared separately by sequential mixing of each component.

The two packs were combined and used within 15 minutes of combination. The panels were cold rolled steel coated with ED5051. The compositions were applied by a first single dust coat followed by a 5-minute flash, and then a slow single coat followed by a 20-minute flash and A 30-minute bake at 140° F. A DEVILBISS GT1 110 cap with a 1.3 mm fluid nozzle, two bar, full fan, was used to apply the coating.

As can be seen in Table 7, the two-pack compositions of the present invention (Samples 19 through 24) gave superior mar and scratch resistance as compared with the control formulation lacking these particles (Sample 18).

TABLE 7

| | Sample 18 | Sample 19 | Sample 20 | Sample 21 | Sample 22 | Sample 23 | Sample 24 |
|---|---|---|---|---|---|---|---|
| Particle 9 | — | 7.71 | — | — | — | — | — |
| Particle 11 | — | — | 7.71 | — | — | — | — |
| Particle 4 | — | — | — | 17.25 | — | — | — |
| Particle 10 | — | — | — | — | 18.00 | — | — |
| Particle 6 | — | — | — | — | — | 7.71 | — |
| Particle 18 paste[18] | — | — | — | — | — | — | 4.26 |
| Solvent[19] | — | 24.74 | 24.74 | 15.73 | 16.41 | 24.74 | 26.7 |
| Acrylic polymer[20] | — | 78.47 | 78.47 | 75.22 | 78.47 | 78.47 | 64.6 |

TABLE 7-continued

| | | | | | | | |
|---|---|---|---|---|---|---|---|
| Solvent[21] | — | 7.34 | 7.34 | 4.66 | 4.87 | 7.34 | 1.78 |
| Isostearic acid[22] | — | 1.98 | 1.98 | 1.90 | 1.98 | 1.98 | — |
| Isocyanate[23] | — | 45.63 | 45.63 | 43.74 | 45.63 | 45.63 | 42.84 |
| Solvent[24] | — | 14.90 | 14.90 | 14.28 | 14.90 | 14.90 | 14.90 |
| Catalyst[25] | — | 0.10 | 0.10 | 0.09 | 0.10 | 0.10 | 0.10 |
| Solvent[26] | — | 1.91 | 1.91 | 1.83 | 1.91 | 1.91 | 1.90 |
| Initial 20° gloss | 88 | 87.8 | 88.2 | 88 | 88 | 88.6 | 75.0 |
| Amtec-Kistler (10x) | 41 | 55.6 | 57 | 58.1 | 55.7 | 53.7 | 46.1 |
| | (46%) | (63.3%) | (64.6%) | (66.0%) | (63.3%) | (60.6%) | (61.0%) |
| Initial 20° gloss | 89 | 87.8 | 88.2 | 88 | 88 | 88.6 | 75.0 |
| BON AMI | 15 | 72.3 | 65.6 | 60.2 | 57.3 | 71.4 | 72.1 |
| | (17%) | (82.3%) | (74.4%) | (68.4%) | (65.1%) | (80.6%) | (96.0%) |

[18]Particle 18 was incorporated into a paste by sealing the following component in an eight ounce jar and shaking a jar on a paint shaker for one hour. The grind media was filtered out and the material was ready to use. 55.6% particle paste was prepared by mixing:

| | |
|---|---|
| Acrylic resin having hydroxyl humidity | 10.6 g |
| Methyl amyl ketone | 22.0 g |
| Particle 18 | 40.9 g |
| SOLSPERSE 2400, commercially from Avecia | 0.10 g |
| 1 mm zircoa beads | 80.0 g |

[19]Methyl n-amyl ketone.
[20]Acylic polymer: 4.8% hydroxylpropylacrylate/19.2% hydroxylethylacrylate/25% isobornyl methacrylate/5% butyl acrylate/23% styrene/17% hydroxyl butyl acrylate/5% Cardura E acrylic acid/1% acrylic acid of about 5000 peak molecular weight.
[21]Exxate 600 solvent (hexyl acetate) from Exxon.
[22]Commercially available from Cognis Energy Group as EMERY 875.
[23]TOLONATE HDT-LV, commercially available from Rhodia Chemical.
[24]Methyl n-amyl ketone.
[25]Dibutyltindilaurate, commercially available from Air Products as T-12.
[26]Exxate 600.

Example 7

Two-pack coatings were prepared using the components and amounts (in grams) shown in Table 8. Sample 25 contained no particle and Sample 26 contained particle and also contained melamine in the resin pack.

The two packs were combined and used within 15 minutes of combination. Cold rolled steel panels coated with ED5051 were used. The samples were applied by drawdown to a target DFT of 1.7 using the wet film applicator described in Example 4. After drawdown, the panels were ambient flashed for 5 to 10 minutes and baked for 30 minutes at 140° C.

TABLE 8

| | Sample 25 | Sample 26 |
|---|---|---|
| Particle 19[27] | — | 6.92 |
| Solvent[28] | 30.0 | 22.0 |
| Acrylic Polymer[29] | 112.38 | 104.38 |
| Solvent[30] | — | 8.0 |
| Melamine[31] | — | 18.75 |
| Catalyst[32] | 0.67 | 0.67 |
| UV Absorber[33] | 3.0 | 3.0 |
| Light Stabilizer[34] | 0.5 | 0.5 |
| Isocyanate[35] | 38.19 | 27.59 |

TABLE 8-continued

| | Sample 25 | Sample 26 |
|---|---|---|
| Initial 20° Gloss | 87.0 | 81.0 |
| 9μ paper | 18.0 | 56.0 |
| | (21.0%) | (69.0%) |

[27]Particle 19 was prepared as follows: to a quart jar was added 333 grams of MT-ST (30% silica in methanol, commercially available from Nissan), 8 grams of perfluorodecyl triethoxysilane (commercially available from Lancaster Synthesis Inc.) and 4 grams of deionized water. The mixture was stirred, covered, and warmed to 120° F. for 16 hours.
[28]Methyl n-amyl ketone.
[29]VK114, hydroxyl functional acrylic, commercially available from PPG Industries, Inc.
[30]n-amyl acetate.
[31]CYMEL 202, commercially available from Cytec Industries, Inc.
[32]PA-75, phenyl acid phosphate, commercially available from Rhodia.
[33]TINUVIN 928, commercially available from Ciba Geigy.
[34]TINUVIN 292, hindered amine light stabilizer, commercially available from Ciba Geigy.
[35]DESMODUR N-3300, polyisocyanate, commercially available from Bayer.

As can be seen from Table 8, Sample 26 of the present invention containing particle and melamine was superior to Sample 25 containing no particle. The addition of melamine gave mar and scratch results greater than that of comparable samples lacking melamine, although those samples were still superior to those with no particles.

Whereas particular embodiments of this invention have been described above for purposes of illustration, it will be evident to those skilled in the art the numerous variations of the details of the present invention may be made without departing from the invention as defined in the appended claims.

Therefore, we claim:

1. A liquid coating comprising:
   a) a film-forming resin; and
   b) a plurality of particles dispersed in said resin, wherein the particles have been chemically modified to have a surface tension lower than that of the film-forming resin as cured without particles.

2. The coating composition of claim 1, wherein the particles have been modified by attachment of a compound having the structure:

wherein F is a moiety comprising a functional group; Z is a moiety that decreases the surface tension of the particle to which it is attached; and L is a group that links F and Z.

3. The coating composition of claim 2, wherein L comprises the reaction product of an epoxy and an amine.

4. The coating composition of claim 2, wherein L comprises the reaction product of an epoxy and a carboxylic acid.

5. The coating composition of claim 4, wherein the carboxylic acid is stearoyl sarcosine.

6. The coating composition of claim 2, wherein L comprises the reaction product of an epoxy and an alcohol.

7. The coating composition of claim 2, wherein L comprises the reaction product of an amine and an isocyanate.

8. The coating composition of claim 2, wherein L comprises the reaction product of an amine and a carboxylic acid.

9. The coating composition of claim 2, wherein L comprises the reaction product of an isocyanate and an alcohol.

10. The coating composition of claim 2, wherein L comprises the reaction product of an acrylate and an amine.

11. The coating composition of claim 1, wherein said particles are modified through the attachment of a compound having the structure:

wherein R is an alkyl group having 1 to 30 carbons; n is 0, 1 or 2; and Z is a moiety that decreases the surface tension of the particle to which it is attached.

12. The coating composition of claim 11, wherein Z comprises a long chain alkyl group.

13. The coating composition of claim 11, wherein Z comprises a fluorocarbon.

14. The coating composition of claim 11, wherein Z comprises a silane to which is attached at least two methyl groups.

15. The coating composition of claim 12, wherein Z is $-(CH_2)_{n1}-CH_3$; wherein $n_1$ is 1 to 30; and wherein the total of n and $n_1$ is 3 or greater.

16. The coating composition of claim 15, wherein $n_1$ is 7 to 17.

17. The coating composition of claim 12, wherein Z is and wherein $n_2$ is 1 to 3, and $R_1$ and $R_2$ are the same or different and $R_1$ can be hydrogen or an alkyl group having 1 to 30 carbons and $R_2$ is an alkyl group having 4 to 30 carbons.

18. The coating composition of claim 13, wherein Z is $-(CF_2)_m-CF_3$, wherein m is 0 to 30.

19. The coating composition of claim 18, wherein m is 7.

20. The coating composition of claim 14, wherein Z is $-(CH_2)_{n3}-(Si(CH_3)_2-O)_{m1}-Si(CH_3)_3$; and wherein $n_3$ is 0 to 17 and $m_1$ is 1 to 50.

21. The coating composition of claim 20, wherein $n_3$ is 0 to 4 and $m_1$ is 1 to 10.

22. The coating composition of claim 1, wherein the surface tension of said modified particles is 50 dynes/cm or less.

23. The coating composition of claim 22, wherein the surface tension of said modified particles is 40 dynes/cm or less.

24. The coating composition of claim 1, wherein there is a greater concentration of particles in the surface region than the bulk region.

25. The coating composition of claim 1, wherein the particles are evenly distributed between the surface and bulk regions.

26. The coating of claim 1, wherein said inorganic particles are selected from silica, alumina, alkali alumina silicate, borosilicate glass, nitrides, metal oxides, quartz, nepheline syenite, zircon, buddeluyite, and eudialyte.

27. The coating of claim 26, wherein said silica is crystalline silica, amorphous silica, fumed silica, precipitated silica or mixtures thereof.

28. The coating of claim 1, wherein the particles are nanoparticles having an average particle size of between 2.0 and 500 nanometers.

29. The coating of claim 28, wherein the average particle size ranges between 5 and 200 nanometers.

30. The coating of claim 1, wherein the particles are microparticles having an average particle size of between 0.5 and 50 microns.

31. The coating of claim 30, wherein the average particle size ranges between 0.5 and 10.

32. The coating of claim 1, wherein the weight percent of the particles is less than 20, with weight percent based on total weight of the composition.

33. The coating of claim 32, wherein the weight percent is between 0.01 and 10.

34. The coating of claim 33, wherein the weight percent is between 0.01 and 8.

35. The coating of claim 11, wherein the Z moiety has no functional groups.

36. The coating composition of claim 1, wherein the coating, when cured and subjected to mar and/or scratch testing, has a greater 20 degree gloss retention as compared to no particle being present.

37. The coating composition of claim 36, wherein the 20 degree gloss retention after mar and/or scratch testing is 20 percent or greater.

38. The coating composition of claim 36, wherein the 20 degree gloss retention after mar and/or scratch testing is 50 percent or greater.

39. The coating composition of claim 36, wherein the 20 degree gloss retention after mar and/or scratch testing is 70 percent or greater.

40. A coating composition comprising:
   a) a film-forming resin; and
   b) a plurality of particles dispersed in said resin, wherein the particles have been chemically modified such that they lower the surface tension of the film-forming resin.

41. A method for lowering the surface tension of a cured coating comprising adding to the uncured liquid coating composition a particle having a lower surface tension that the cured coating has without the addition of the particle.

42. The coating composition of claim 37, wherein the cured coating has a flexibility of at least 6 at a temperature of 70° F.

43. The coating composition of claim 42, wherein the cured coating has a flexibility of at least 8 at temperature of 70° F.

44. The coating composition of claim 38, wherein the cured coating has a flexibility of at least 6 at a temperature of 70° F.

45. The coating composition of claim 44, wherein the cured coating has a flexibility of at least 8.

46. The coating composition of claim 39, wherein the cured coating, has a flexibility of at least 6 at a temperature of 70° F.

47. The coating composition of claim 46, wherein the cured coating has a flexibility of at least 8.

48. A cured coating comprising:
   a) a film-forming resin; and
   b) a plurality of particles dispersed in said resin, wherein the particles have been chemically modified to have a surface tension lower than that of the film-forming resin as cured without particles;
   having a gloss retention after mar and/or scratch testing of 38 percent or greater and a flexibility of 6 or greater at a temperature of 70° F.

49. The cured coating of claim 48 having a gloss retention after mar and/or scratch testing of 55 percent or greater and a flexibility of 8 or greater.

50. The cured coating of claim 48 having a gloss retention after mar and/or scratch testing of 75 percent or greater and a flexibility of 8 or greater.

51. The liquid coating composition of claim 1, wherein the coating is a 1K system.

52. The liquid coating composition of claim 1, wherein the coating is a 2K system.

53. The coating composition of claim 2, wherein the Z moiety has no functional groups.

54. The coating composition of claim 53, wherein L comprises the reaction product of an epoxy and an amine.

55. The coating composition of claim 53, wherein L comprises the reaction product of an epoxy and a carboxylic acid.

56. The coating composition of claim 55, wherein the carboxylic acid is stearoyl sarcosine.

57. The coating composition of claim 53, wherein L comprises the reaction product of an epoxy and an alcohol.

58. The coating composition of claim 53, wherein L comprises the reaction product of an amine and an isocyanate.

59. The coating composition of claim 53, wherein L comprises the reaction product of an amine and a carboxylic acid.

60. The coating composition of claim 53, wherein L comprises the reaction product of an isocyanate and an alcohol.

61. The coating composition of claim 53, wherein L comprises the reaction product of an acrylate and an amine.

* * * * *